(12) United States Patent
Saito

(10) Patent No.: US 10,426,019 B2
(45) Date of Patent: Sep. 24, 2019

(54) LIGHTING DEVICE THAT CONTROLS LIGHT EMISSION, METHOD OF CONTROLLING SAME, AND STORAGE MEDIUM

(71) Applicant: CANON KABUSHIKI KAISHA, Tokyo (JP)

(72) Inventor: Keiichiro Saito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/243,223

(22) Filed: Jan. 9, 2019

(65) Prior Publication Data

US 2019/0223277 A1 Jul. 18, 2019

(30) Foreign Application Priority Data

Jan. 15, 2018 (JP) .................. 2018-004350

(51) Int. Cl.
| | |
|---|---|
| *H05B 37/00* | (2006.01) |
| *H05B 41/14* | (2006.01) |
| *H05B 41/30* | (2006.01) |
| *G03B 15/05* | (2006.01) |

(52) U.S. Cl.
CPC ............ *H05B 41/30* (2013.01); *G03B 15/05* (2013.01)

(58) Field of Classification Search
CPC ............ G09G 3/22; G09G 2320/0233; H05B 37/0272; H05B 41/00; H05B 41/36; H05B 41/34; H05B 41/32; H05B 41/30; H05B 33/0803; F02P 17/06; H01J 19/36; H01J 2893/0027; H01J 7/24; H01J 61/523; H01J 61/52; H01J 65/044; H01J 13/32; H04B 1/036; F21K 9/00; F21V 29/004

See application file for complete search history.

(56) References Cited

U.S. PATENT DOCUMENTS

| | | | |
|---|---|---|---|
| 2016/0084869 A1* | 3/2016 | Yuen | G01P 7/00 73/510 |
| 2017/0231053 A1* | 8/2017 | Underwood | G06T 7/20 |

FOREIGN PATENT DOCUMENTS

JP 2013083810 A 5/2013

\* cited by examiner

*Primary Examiner* — Minh D A
(74) *Attorney, Agent, or Firm* — Rossi, Kimms & McDowell LLP

(57) ABSTRACT

A lighting device that properly controls light emission, thereby making it possible to perform product protection of the lighting device from generated heat without impairing usability. The lighting device is capable of using a plurality of types of batteries attached thereto, and includes a light emission section to which electric power is supplied from the attached battery. The lighting device includes a processor that functions as a light emission control unit configured to control light emission from the light emission section, and an acquisition unit configured to acquire information on the battery, including information on a temperature of the attached battery. A parameter for use in limiting light emission from the light emission section is determined based on a result of acquisition of the information on the battery.

12 Claims, 10 Drawing Sheets

*FIG. 9*

| DETERMINATION NUMBER | STEP NUMBER | BATTERY IDENTIFICATION DETERMINATION | RELIABILITY DETERMINATION |
|---|---|---|---|
| 1 | S812 | REGULAR DEDICATED BATTERY | HIGH |
| 2 | | | LOW |
| 3 | S813 | REGULAR BATTERY | HIGH |
| 4 | | | LOW |
| 5 | | UNKNOWN BATTERY | LOW |
| 6 | S814 | NON-REGULAR BATTERY | MEDIUM |
| 7 | | | LOW |
| 8 | S815 | GENERAL-PURPOSE BATTERY | LOW |

LIGHTING DEVICE THAT CONTROLS LIGHT EMISSION, METHOD OF CONTROLLING SAME, AND STORAGE MEDIUM

BACKGROUND OF THE INVENTION

Field of the Invention

The present invention relates to a lighting device, such as a strobe device, that is capable of using a plurality of types of batteries attached thereto, a method of controlling the same, and a storage medium.

Description of the Related Art

A lighting device, such as a strobe device, is equipped with a function of limiting a temperature increased by continuous light emission to a range in which the device can be safely used, for the purpose of performing product protection of the lighting device, and various types of batteries are used as a power source applicable to the lighting device. The performances of the various types of batteries are various and not unified, and hence the continuous light emission performance of the lighting device depends on the performance of a battery. For this reason, if a limit of light emission is set based on a battery which is liable to generate more heat, the number of times of light emission which can be performed and the light emission performance are reduced, which impairs the usability of the lighting device.

As a solution to this problem, Japanese Laid-Open Patent Publication (Kokai) No. 2013-83810 discloses a power supply control device that selects a charging mode of a battery depending on whether or not identification information of the battery is obtained, and charges the battery according to the selected charging mode to thereby suppress the charging current and protect the lighting device.

According to Japanese Laid-Open Patent Publication (Kokai) No. 2013-83810, however, although the power supply control device has a plurality of charging modes, in a case where it is impossible to obtain prescribed identification information, charging is limited from an initial state in which heat is not generated yet. Therefore, in a photographing site where a shutter chance is important, the lighting device can have a difficulty in providing satisfactory usability. Further, this power supply control device is not capable of coping with aging caused by continuous use thereof, and hence the selected charging mode is not necessarily always optimum until the end of use.

SUMMARY OF THE INVENTION

The present invention provides a lighting device that properly controls light emission, and thereby makes it possible to perform product protection of the lighting device from generated heat without impairing usability, by using battery information of a battery which supplies electric power necessary for starting the lighting device, a method of controlling the same, and a storage medium.

In a first aspect of the present invention, there is provided a lighting device that is capable of using a plurality of types of batteries attached thereto, and includes a light emission section to which electric power is supplied from a battery attached thereto, the lighting device comprising at least one processor that functions, according to one or more programs in a memory, as units comprising a light emission control unit configured to control light emission from the light emission section, and an acquisition unit configured to acquire information on the battery, including information on a temperature of the attached battery, wherein the light emission control unit determines a parameter for use in limiting light emission from the light emission section based on a result of acquisition of the information on the battery by the acquisition unit.

In a second aspect of the present invention, there is provided a method of controlling a lighting device that is capable of using a plurality of types of batteries attached thereto, and includes a light emission section to which electric power is supplied from a battery attached thereto, comprising controlling light emission from the light emission section, acquiring information on the battery, including information on a temperature of the attached battery, and determining a parameter for use in limiting light emission from the light emission section based on a result of acquisition of the information on the battery.

In a third aspect of the present invention, there is provided a non-transitory computer-readable storage medium storing a computer-executable program for executing a method of controlling a lighting device that is capable of using a plurality of types of batteries attached thereto, and includes a light emission section to which electric power is supplied from a battery attached thereto, wherein the method comprises controlling light emission from the light emission section, acquiring information on the battery, including information on a temperature of the attached battery, and determining a parameter for use in limiting light emission from the light emission section based on a result of acquisition of the information on the battery.

According to the present invention, it is possible to provide a lighting device that properly controls light emission, and thereby makes it possible to perform product protection of the lighting device from generated heat without impairing usability, by using battery information of a battery which supplies electric power necessary for starting the lighting device.

Further features of the present invention will become apparent from the following description of exemplary embodiments (with reference to the attached drawings).

BRIEF DESCRIPTION OF THE DRAWINGS

FIG. 9 is a diagram showing determination bits which are set according to different cases.

DESCRIPTION OF THE EMBODIMENTS

The present invention will now be described in detail below with reference to the accompanying drawings showing embodiments thereof.

Figure 1:
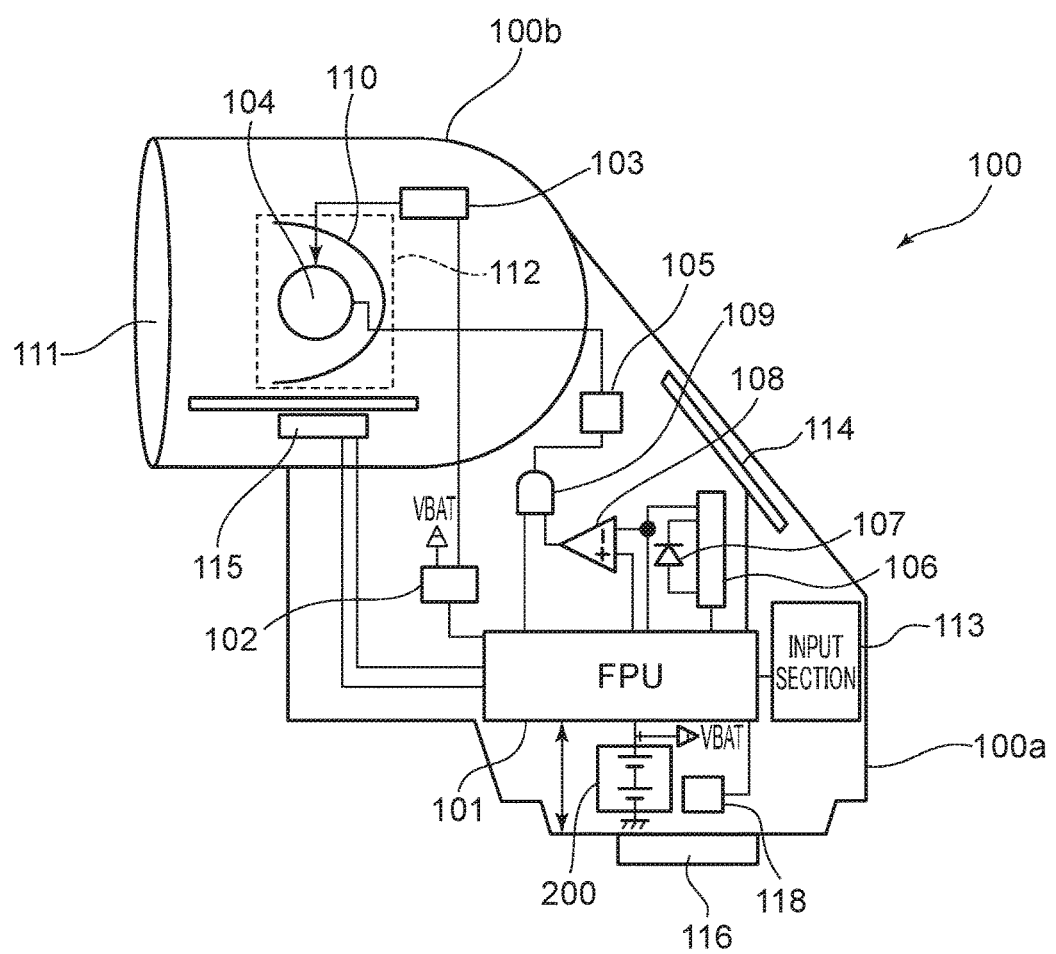
FIG. 1 is a schematic cross-sectional view of a strobe device as a lighting device according to a first embodiment of the present invention.
Figure 2:
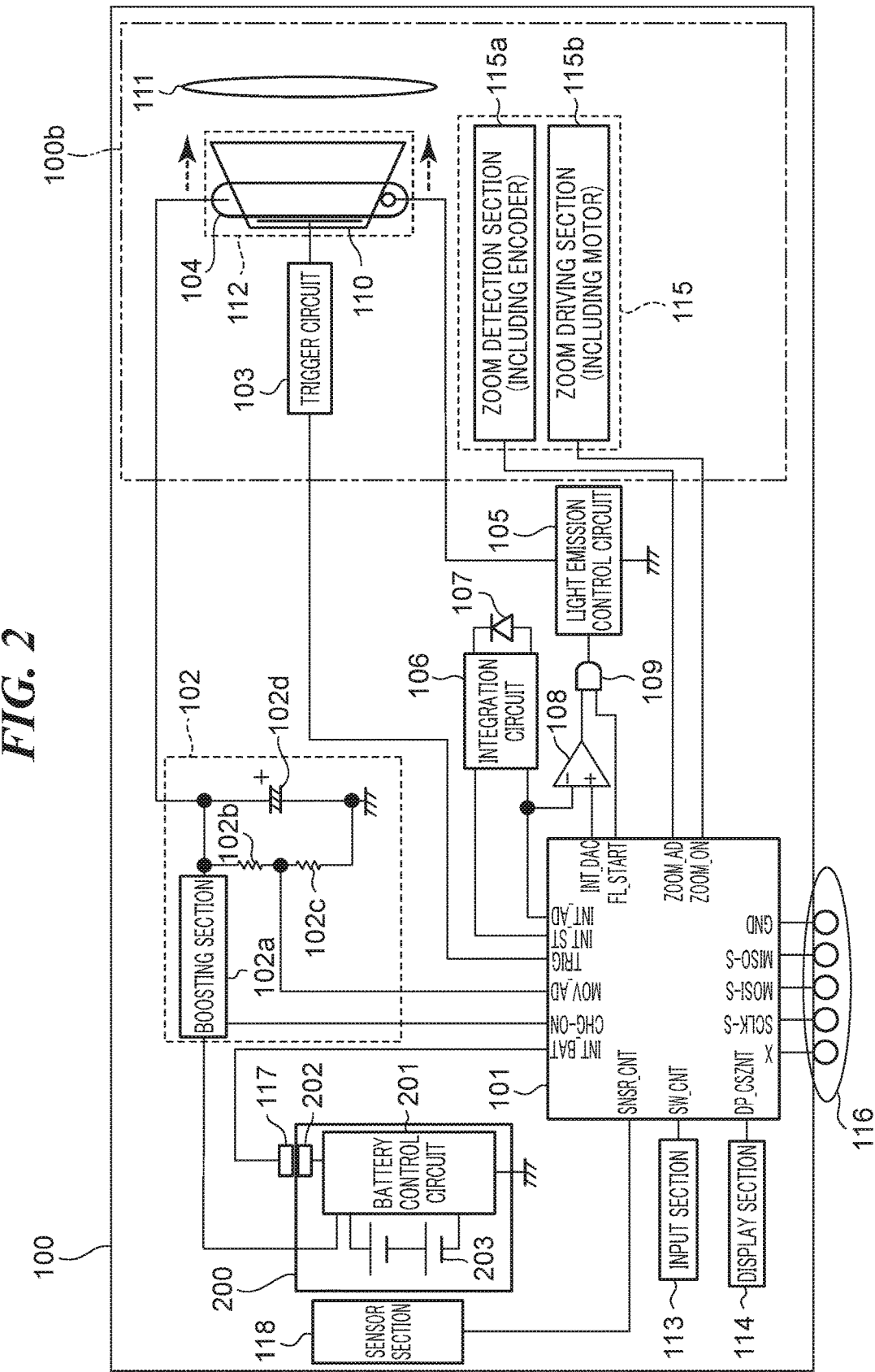
FIG. 2 is a schematic block diagram of a control system of the strobe device shown in FIG. 1.

FIG. 1 is a schematic cross-sectional view of a strobe device as a lighting device according to a first embodiment of the present invention. FIG. 2 is a schematic block diagram of a control system of the strobe device shown in FIG. 1.

As shown in FIGS. 1 and 2, the strobe device, denoted by reference numeral 100, as the lighting device according to the present embodiment, includes a strobe body 100a removably mounted on a camera body, not shown, and a light emission section 100b held such that it is rotatable in a vertical direction (up-down direction) and a horizontal direction (left-right direction) with respect to the strobe body 100a. Note that in the present embodiment, the direction of rotation of the light emission section 100b is defined assuming that a portion of the strobe both 100a on which the light emission section 100b is mounted is an upper portion.

A microcomputer FPU (hereinafter referred to as the strobe controller) 101 controls the overall operation of the strobe device 100. The strobe controller 101 is implemented e.g. by a microcomputer-incorporated one-chip IC circuit which includes a CPU, a ROM, a RAM, an input/output control circuit (I/O control circuit), a multiplexer, a timer circuit, an EEPROM, an analog-to-digital converter, a digital-to-analog converter, and so forth Note that a dedicated light emission controller, a microcomputer and a memory for a determination section, and so on, may be provided according to each function.

A battery 200 functions as a power supply (VBAT) for the strobe device 100. Details of the battery 200 will be described hereinafter. A boosting circuit block 102 is comprised of a boosting section 102a, resistors 102b and 102c used for detecting voltage, and a main capacitor 102d. The boosting circuit block 102 boosts the voltage of the battery 200 up to several hundred volts by the boosting section 102a, to thereby accumulate electric energy for light emission in the main capacitor 102d.

The charge voltage of the main capacitor 102d is divided by the resistors 102b and 102c, and the divided voltage is input to an analog-to-digital converter terminal of the strobe controller 101. A trigger circuit 103 applies a pulse voltage for exciting a discharge tube 104, described hereinafter, to the discharge tube 104. A. light emission control circuit 105 controls the start and stop of light emission from the discharge tube 104. The discharge tube 104 has pulse voltage of several kilovolts applied thereto from the trigger circuit 103, whereby it is excited to emit light using an electric energy charged in the main capacitor 102d.

An integration circuit 106 integrates the electric current output from a photodiode 107, described hereinafter, which corresponds to the amount of received light, and outputs a result of the integration to an inverting input terminal of a comparator 108, described hereinafter, and an analog-to-digital converter terminal of the strobe controller 101. A non-inverting input terminal of the comparator 108 is connected to a digital-to-analog converter terminal of the strobe controller 101, and an output terminal of the comparator 108 is connected to one of input terminals of an AND gate 109. The other of the input terminals of the AND gate 109 is connected to a light emission control terminal of the strobe controller 101, and an output from the AND gate 109 is input to the light emission control circuit 105. The photodiode 107 is a sensor for receiving light emitted from the discharge tube 104, and receives light emitted from the discharge tube 104 directly or via a glass fiber or the like.

A reflection umbrella 110 reflects light emitted from the discharge tube 104, and guides the light in a pre-determined direction. A zoom optical system including an optical panel 111, etc., is held in such a manner that a relative position between the zoom optical system and a reflection umbrella unit 112 including the discharge tube 104 and the reflection umbrella 110 can be changed. By changing a relative position between the reflection umbrella unit 112 and the optical panel 111, it is possible to change a guide number and a light distribution angle of the strobe device 100. The light emission section 100b of the strobe device 100 is mainly comprised of the discharge tube 104, the reflection umbrella 110, and the optical panel 111. The light distribution angle of the light emission section 100b is changed by moving the reflection umbrella unit 112, and the direction of irradiating light from the light emission section 100b is changed by rotating the light emission section 100b with respect to the strobe body 100a.

An input section 113 includes an operation section comprised of a power switch, a mode setting switch for setting an operation mode of the strobe device 100, and setting buttons for setting various parameters, and the strobe controller 101 performs various processes in response to inputs to the input section 113. A display section 114 includes a liquid crystal device and a light emitting element, and displays information indicative of the states of the strobe device 100.

A zoom drive circuit 115 is comprised of a zoom detection section 115a that detects information on the relative position between the reflection umbrella unit 112 and the optical panel 111 by an encoder or the like, and a zoom driving section 115b that includes a motor for moving the reflection umbrella unit 112. The strobe controller 101 acquires focal length information of a photographic lens via the camera body, and calculates a driving amount of the reflection umbrella unit 112 based on the acquired focal length information.

A terminal 116 includes an SCLK_S terminal for synchronizing communication between the camera body and the strobe device 100, an MOSI_S terminal for transmitting data from the camera body to the strobe device 100, and an MISO_S terminal for receiving data transmitted from the strobe device 100. Further, the terminal 116 also includes a GND terminal to which both of the camera body and the strobe device 100 are connected.

A battery detection terminal 117 is connected to the strobe controller 101, and when the battery 200, described hereinafter, is removably attached to the strobe device 100, the battery detection terminal 117 is connected to an information output terminal 202, described hereinafter, and thereby transmits various information received from the battery 200 to the strobe controller 101. A sensor section 118 is connected to the strobe controller 101, and is comprised of various sensors for detecting voltage and discharge current, an internal resistance value, a temperature, a battery remaining amount, and so on, used for monitoring the state of the battery 200, referred to hereinafter. The various items of information detected by the sensor section 118 are transmitted to the strobe controller 101, and are stored in a built-in memory of the strobe controller 101.

Next, the construction of the battery 200 will be described. The battery 200 is comprised of packaging a battery control circuit 201, a rechargeable secondary battery cell 203, and an external terminal section including a charge/discharge terminal and the information output terminal 202.

The battery control circuit 201 controls the components such that charging/discharging of the secondary battery cell 203 is safely performed. The battery control circuit 201 is implemented e.g., by a microcomputer-incorporated one-chip IC circuit which includes a CPU, a ROM, a RAM, an input/output control circuit, etc. Further, the battery control circuit 201 includes various sensors for detecting a battery voltage and a discharge current, an internal resistance value, an internal temperature, a battery remaining amount, and so on, for monitoring the state of the battery 200, and the ROM stores ID information, etc., necessary for identifying a battery.

The information output terminal 202 is an information output terminal for transmitting the various information detected by the battery control circuit 201 to the strobe controller 101, and when the battery 200 is attached to the strobe device 100, the information output terminal 202 is brought into contact with the battery detection terminal 117 to thereby transmit the various information to the strobe controller 101. The secondary battery cell 203 is connected to the battery control circuit 201, and is connected to the strobe device 100 via the battery control circuit 201 to thereby supply electric power to the strobe device 100.

Figure 3:
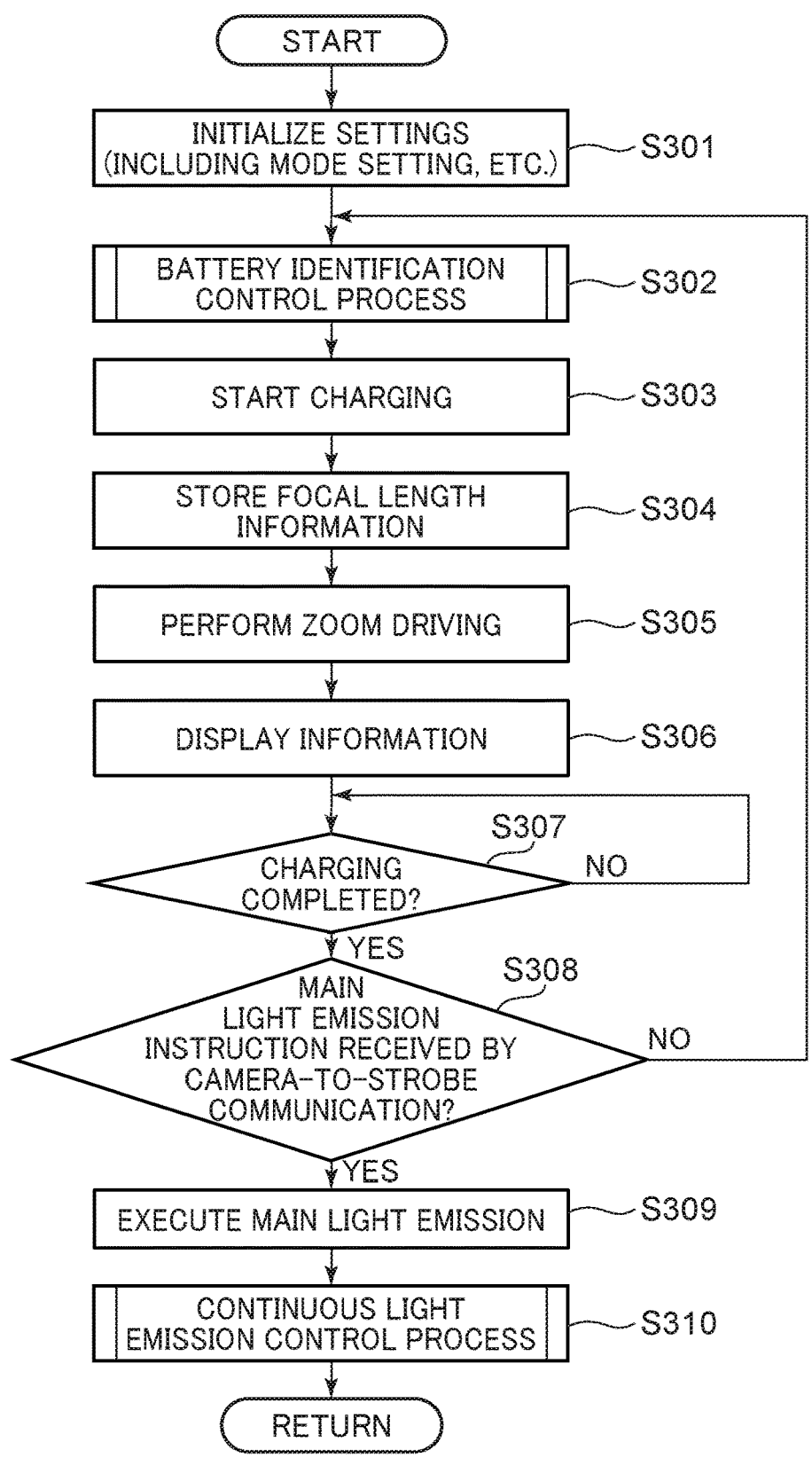
FIG. 3 is a flowchart of a light emission process performed by the strobe device.

Next, a light emission process performed by the strobe device 100 will be described with reference to FIG. 3. FIG. 3 is a flowchart of the light emission process performed by the strobe device 100. The processing steps in FIG. 3 are executed e.g. by the CPU that loads the program stored e.g. in the ROM of the strobe controller 101 into the RAM.

Referring to FIG. 3, in a step S301, the strobe controller 101 initializes the memory and ports thereof. Further, the strobe controller 101 reads the states of the switches included in the input section 113, and input information set in advance, makes various settings of a light emission mode, such a light emission amount determination method and a light emission timing, and then proceeds to a step S302.

In the step S302, the strobe controller 101 performs a battery identification control process for identifying an attached battery, and determining a parameter for use in limiting light emission, by using the battery information. In a case where the battery identification control process includes processing for monitoring the state of the battery attached to the strobe device 100, it is desirable to perform the monitoring processing in parallel with light emission processing performed in a step S303 et seq. Details of the battery identification control process will be described hereinafter. Then, after determining a parameter for use in limiting light emission, the strobe controller 101 stores the determined parameter information in the built-in memory thereof, and proceeds to the step S303.

In the step S303, the strobe controller 101 starts the operation of the boosting circuit block 102 to start charging of the main capacitor 102d, and then proceeds to a step S304. In the step S304, the strobe controller 101 stores the focal length information of the photographic lens, not shown, acquired from a camera controller, not shown, via the terminal 116, in the memory thereof, and then proceeds to a step S305. Note that in a case where the focal length information has been stored before, the strobe controller 101 updates the focal length information to the new focal length information.

In the step S305, the strobe controller 101 causes the zoom drive circuit 115 to move the reflection umbrella unit 112 such that the light distribution angle of the strobe light is within a range corresponding to the acquired focal length information, and then proceeds to a step S306. Note that in a case where it is unnecessary to move the reflection umbrella unit 112, this step can be omitted.

In the step S306, the strobe controller 101 displays an image associated with the light emission mode set via the input section 113, an image associated with the acquired focal length information, etc., on the display section 114, and proceeds to a step S307.

In the step S307, the strobe controller 101 checks whether or not charging of the main capacitor 102d is completed, and if charging is completed, the strobe controller 101 transmits a charging completion signal to the camera controller, not shown, and proceeds to a step S308.

In the step S308, the strobe controller 101 determines whether or not a light emission start signal has been received from the camera controller, not shown, as a light emission instruction, and if the light emission start signal has been received, the strobe controller 101 proceeds to a step S309, whereas if not, the strobe controller 101 returns to the step S302.

In the step S309, the strobe controller 101 provides a light emission instruction to the light emission control circuit 105 according to the received light emission start signal. Then, after the light emission control circuit 105 causes the discharge tube 104 to emit light according to the light emission instruction, the strobe controller 101 stores the information associated with light emission, such as voltage information of the main capacitor 102d, in the built-in memory thereof, and proceeds to a step S310. Note that in the step S309, in a case where the series of light emission, such as preliminary light emission for light adjustment and main light emission, are performed, the process does not return to the step S302 upon termination of each light emission, but returns to the step S302 only after termination of the series of light emission.

In the step S310, the strobe controller 101 starts a continuous light emission control process for controlling light emission and charging so as to prevent the temperature of the strobe device 100 from becoming abnormally high even when heat is continuously applied by light emission, such as continuous light emission. Details of the continuous light emission control process will be described hereinafter. This continuous light emission control process starts calculation from a first light emission and is terminated when the result of the calculation returns to an initial state thereof.

More specifically, the strobe controller 101 estimates a temperature of part to be protected from the influence of heat generated by light emission, and starts calculation of the estimated temperature of the protection target part or a counter used as a substitute for the estimated temperature, from the first light emission. Then, the strobe controller 101 continues the calculation in parallel with the light emission process described above, until time elapses which is required to discharge the heat until the calculation result becomes equal to the initial state, or until the counter is reset. Although in the present embodiment, this process is referred to as the continuous light emission control process, the same process is performed also with respect to single light emission. After the continuous light emission control process is started, the light emission process returns to the step S302.

Next, the battery identification control process performed by the strobe device 100 in the step S302 in FIG. 3 will be described with reference to FIG. 4. In this battery identification control process, the strobe device 100 acquires information on the temperature of the battery 200 attached thereto, and determines a parameter for use in limiting light emission based on the acquired information. The protection target part of the strobe device 100 varies with the performance of the battery 200, and hence the parameter is set in a manner adapted to the performance of the battery 200.

This is because the performance of the strobe device 100 is dependent on the type, specifications, and performance of the battery 200 attached thereto. For example, in a case where a battery, such as a lithium-series secondary battery, is used as the secondary battery cell 203, although depending on the degree of aging, in general, it is possible to perform high speed charging of the main capacitor 102d, and further, since the internal resistance value is relatively small, the amount of heat generated by the battery 200 of this type is small in many cases.

On the other hand, in a case where a battery, such as an alkaline primary battery, is used, the charging speed of the main capacitor 102d is lower than that of the above-mentioned lithium-series secondary battery, and the internal resistance value is relatively large, and hence the battery 200 of this type is generally liable to generate much heat. Therefore, it is necessary to identify the attached battery 200, and set a limit to light emission according to the performance of the identified battery 200.

This implies that the protection target part of the strobe device changes, and in the cases of the above-mentioned examples, when using a battery which is small in internal resistance value and is capable of performing high speed charging of the main capacitor 102d, is possible to perform high speed continuous light emission, and hence it is necessary to most preferentially protect the optical panel 111. On the other hand, when using a battery which is large in internal resistance value and generates much heat, it is necessary to protect a battery attachment portion of the strobe body 100 and its vicinity, and the battery 200, from the viewpoints of product protection of the strobe device 100, prevention of low-temperature burn, and so forth.

Figure 4:
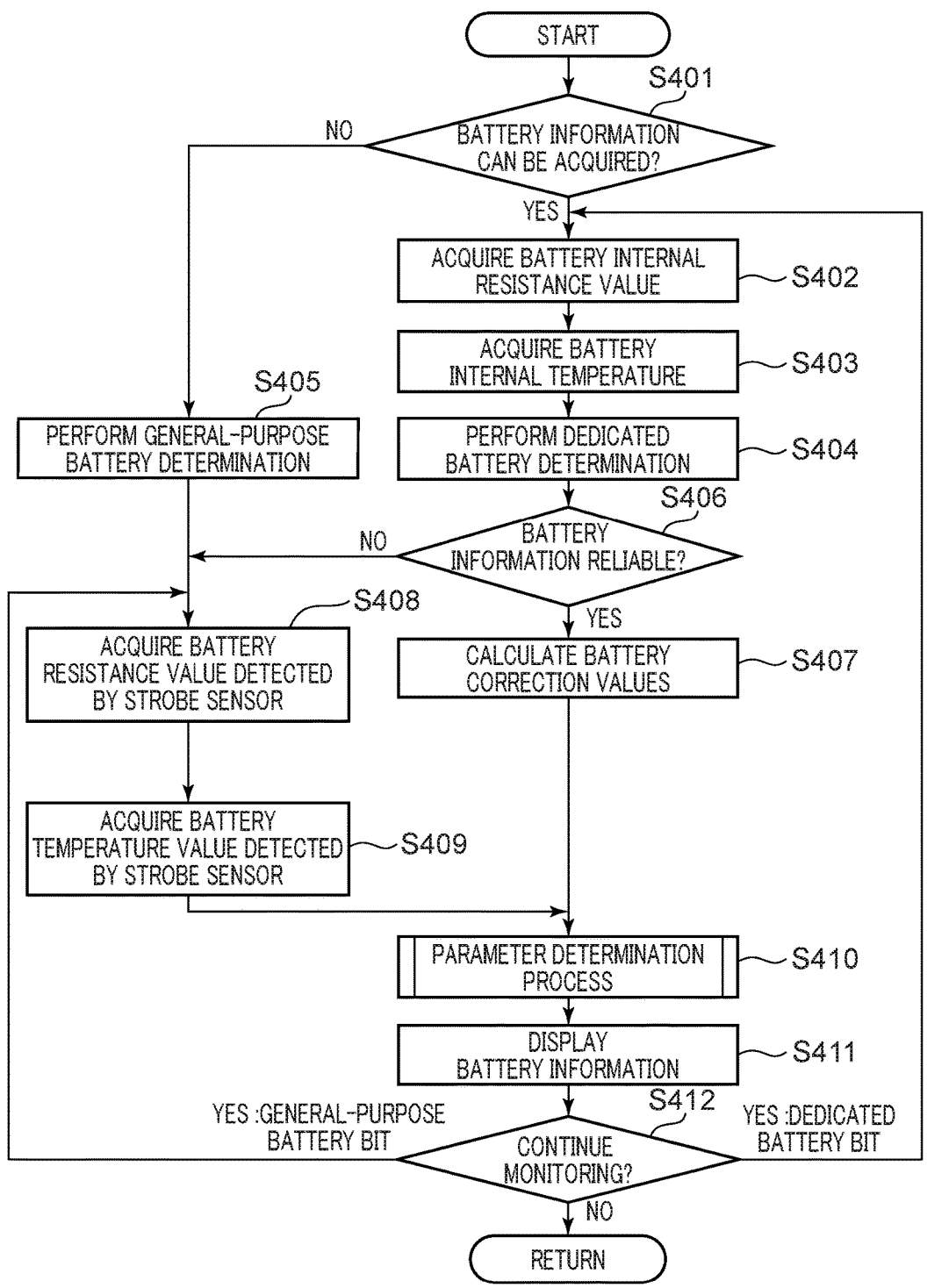
FIG. 4 is a flowchart of a battery identification control process performed in a step in FIG. 3.

FIG. 4 is a flowchart of the battery identification control process performed by the strobe device 100 in the step S302 in FIG. 3. Note that in the description of the battery identification control process given with reference to FIG. 4, the battery attachment portion of the strobe body 100a and its vicinity, and the battery 200 are assumed to be the protection target part. Further, when the strobe controller 101 recognizes the attached battery 200 in the step S302 in FIG. 3, the strobe controller 101 starts the battery identification control process in FIG. 4 in parallel with the light emission process in FIG. 3, and terminates the same before the light emission process reaches the step S310 in FIG. 3.

Referring to FIG. 4, in a step S401, the strobe controller 101 determines whether or not it is possible to acquire information on the attached battery 200 (battery information) before performing the battery identification control. This determination is performed e.g. by determining whether or not an analog value has been directly transmitted to the strobe controller 101, through connection of the various sensors included in the battery control circuit 201 to the information output terminal 202, and bringing the information output terminal 202 and the battery detection terminal 117 into contact with each other.

Further, this determination is performed by determining whether or not values obtained by converting outputs from the various sensors from analog to digital by the battery control circuit 201 have been transmitted to the strobe controller 101 by communication. Alternatively, the determination may be performed by providing an adapter which makes it possible to convert a general-purpose battery into one having the shape of a dedicated battery, and determining, when the general-purpose battery is detected, that the battery information cannot be acquired because the attached battery is the general-purpose battery.

Then, if it is possible to acquire the information of the internal resistance value or the internal temperature of the battery 200 from the battery control circuit 201 by communication via the battery detection terminal 117 and the information output terminal 202, the strobe controller 101 proceeds to a step S402, whereas if not, the strobe controller 101 proceeds to a step S405.

In the step S402, the strobe controller 101 acquires an internal resistance value of the battery 200 from an associated one of the sensors of the battery control circuit 201 via the information output terminal 202 and the battery detection terminal 117. Note that the strobe controller 101 may calculate the internal resistance value by acquiring a battery voltage and a discharge current using an associated one of the sensors included in the battery control circuit 201 without directly acquiring the internal resistance value. Then, the strobe controller 101 stores the acquired internal resistance value in the built-in memory thereof, and proceeds to a step S403. Note that in a case where the internal resistance value cannot be acquired, this step is omitted.

In the step S403, the strobe controller 101 acquires an internal temperature of the battery 200 from an associated one of the sensors of the battery control circuit 201 via the information output terminal 202 and the battery detection terminal 117, stores the acquired internal temperature in the built-in memory thereof, and then proceeds to a step S404. Note that although this step is omitted in a case where the internal temperature cannot be acquired, the description is given assuming that at least one of the internal resistance value and the internal temperature is acquired in the step S402 and/or in this step.

In the step S404, the strobe controller 101 checks whether or not the result(s) acquired in the step(s) S402 and/or S403 is/are within (a) predetermined threshold value(s), which can be estimated. Then, if the acquired results(s) is/are within the predetermined threshold value(s), the strobe controller 101 sets a determination bit indicative of the dedicated battery, and determines that the attached battery 200 is a dedicated battery and the battery information is reliable, On the other hand, if the acquired result(s) is/are not within the predetermined threshold value(s), the strobe controller 101 determines that although an output of the battery information has been received, the received information is low in reliability, and sets a determination bit indicative of low reliability. Then, the strobe controller 101 stores the set determination bit in the built-in memory thereof, and proceeds to a step S406.

In the step S406, the strobe controller 101 determines whether or not the battery information of the attached battery 200 is reliable. If it is determined based on the determination bit set in the step S404 that the battery information of the attached battery 200 is reliable, the strobe controller 101 proceeds to a step S407, whereas if not, the strobe controller 101 proceeds to a step S408.

In the step S405, the strobe controller 101 treats the attached battery 200 as a general-purpose battery because no battery information can be acquired from the attached battery 200, and hence the strobe controller 101 sets a determination bit indicative of a general-purpose battery, stores the set determination bit in the built-in memory thereof, and then proceeds to the step S408.

In the step S407, the strobe controller 101 calculates correction values for offset based on the information acquired from the battery 200, which are necessary for processing to be performed within the strobe device 100, stores the calculated correction values for offset in the built-in memory thereof, and then proceeds to a step S410.

Here, the step S407 is executed for prevention of different calculation results, in a case where a parameter determination process, described hereinafter, includes a calculation performed by simultaneously using an output from an associated one of the various sensors of the battery control circuit 201 and an output from the sensor section 118. In this case, each correction value may be determined based on a difference between the output results obtained by the measurement operations performed at the same timing. Note that in a case where an output from an associated one of the various sensors of the battery control circuit 201 and a corresponding output from the sensor section 118 are separately used for respective different purposes, and the offset is unnecessary, this step may be omitted.

In the step S408, the strobe controller 101 acquires an internal resistance value of the battery 200 from the output from the sensor section 118, stores the acquired internal resistance value in the built-in memory thereof, and then proceeds to a step S409. Note that the internal resistance value may be calculated by acquiring a battery voltage and a discharge current. Further, in a case where the internal resistance value has already been acquired, the value is updated, and in a case where the determination bit indicative of the dedicated battery (dedicated battery bit) has been set, this determination bit is cleared, and the determination bit indicative of the general-purpose battery (general-purpose battery bit) is set. In a case where the internal resistance value cannot be acquired, this step is omitted.

In the step S409, the strobe controller 101 acquires an internal temperature of the battery 200 from the output from the sensor section 118, stores the acquired internal temperature in the built-in memory thereof, and then proceeds to the step S410. Note that in a case where the internal temperature has already been acquired, the value is updated, and in a case where the dedicated battery bit has been set, this bit is cleared, and the general-purpose battery bit is set. However, it is assumed that at least one of the internal resistance value and the internal temperature has been acquired in the step S408 and/or in this step.

In the step S410, the strobe controller 101 determines a parameter for use in limiting light emission based on the information acquired in the steps S402 to S409, stores the determined parameter in the built-in memory thereof, and then proceeds to a step S411. Details of the parameter determination process will be described hereinafter with reference to FIG. 5.

In the step S411, the strobe controller 101 displays the acquired information concerning the attached battery 200 on the display section 114, and proceeds to a step S412. The information displayed in this step is a light emission limiting level based on the parameter determined in the step S410, the current internal temperature and battery remaining amount of the battery 200, and so forth.

In the step S412, the strobe controller 101 determines whether or not to monitor the state of the current battery 200. This determination is performed by determining whether or not a predetermined time period has elapsed using a timer function of the strobe controller 101. This causes, whenever the predetermined time period elapses, i.e. at a predetermined period, the strobe controller 101 to monitor the state of the battery 200 by acquiring an output result from the battery control circuit 201 or the sensor section 118. If the dedicated battery bit has been set, the strobe controller 101 returns to the step S402, whereas if the general-purpose battery bit has been set, the strobe controller 101 returns to the step S408. Note that the strobe controller 101 may monitor the state of the battery 200 not at a predetermined period, but based on a condition, such as the number of times of light emission from the light emission section 100b. If it is determined that monitoring of the battery 200 is not to be performed, the present battery identification control process is terminated.

Figure 5:
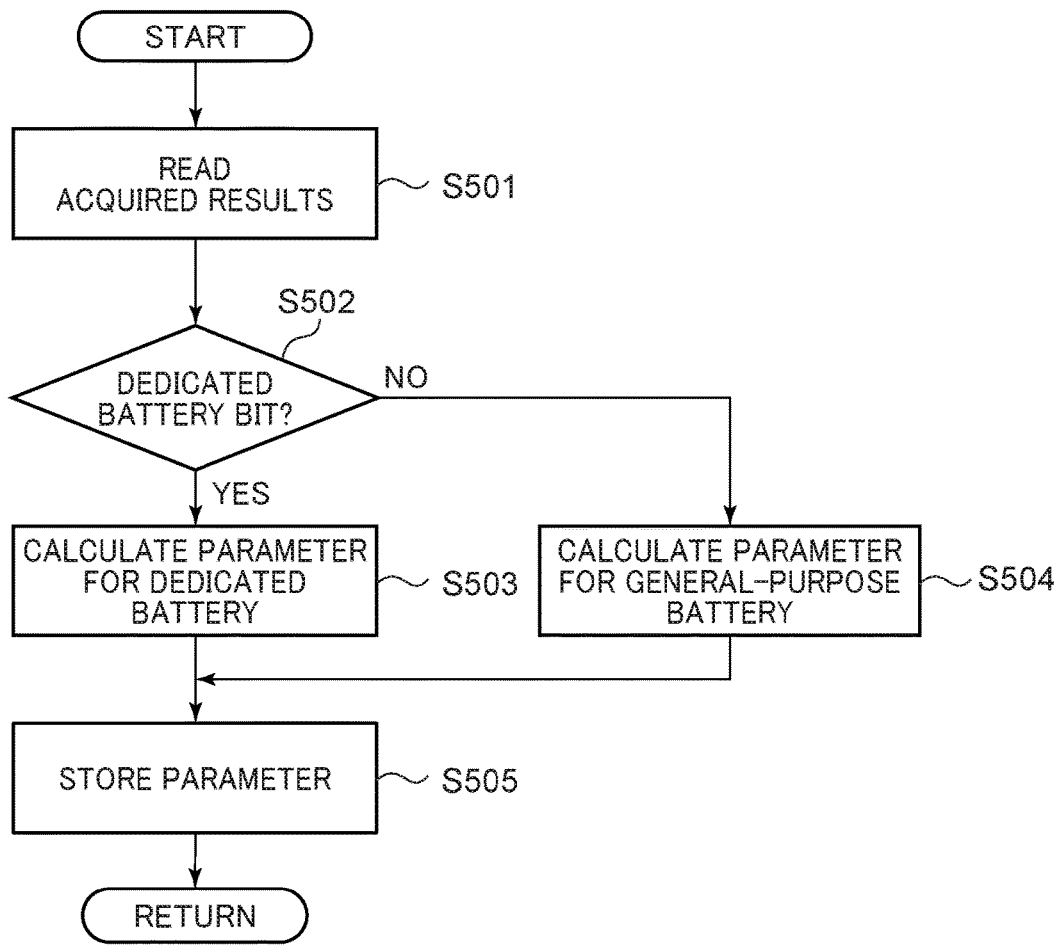
FIG. 5 is a flowchart of a parameter determination process performed in a step in FIG. 4.

Next, the parameter determination process performed in the step S410 in FIG. 4 will be described with reference to FIG. 5. FIG. 5 is a flowchart of the parameter determination process performed in the step S410 in FIG. 4. In this parameter determination process, the parameter is determined based on the information acquired in the steps S402 to S409.

Referring to FIG. 5, in a step S501, the strobe controller 101 reads the determination bit, the output results from the various sensors, and the correction values, acquired in the steps S402 to S409, and proceeds to a step S502.

In the step S502, the strobe controller 101 determines whether the read determination bit is the dedicated battery bit or the general-purpose battery bit. The number of types of determination bits may be increased as required depending on a light emission limiting method, described hereinafter, and the present process may be branched for each type. Then, if the dedicated battery bit is set, the strobe controller 101 proceeds to a step S503, whereas if the general-purpose battery bit is set, the strobe controller 101 proceeds to a step S504.

In the step S503, the strobe controller 101 calculates a parameter for use in limiting light emission for the dedicated battery, and proceeds to a step S505. The calculation method will be described hereinafter. In the step S504, the strobe controller 101 calculates a parameter for use in limiting light emission for the general-purpose battery, and proceeds to the step S505. The calculation method will be described hereinafter.

In the step S505, the strobe controller 101 stores the parameter calculated in the step S503 or S504 in the built-in memory thereof, followed by terminating the parameter determination process.

Next, the continuous light emission control process performed in the step S310 in FIG. 3 will be described with reference to FIG. 6. In this continuous light emission control process, light emission is limited so as to protect the strobe device from the influence of heat generated by light emission. In the light emission limitation, the protection target part and the result of limiting are different depending on the results of the battery identification control process and the parameter determination process.

Figure 6:
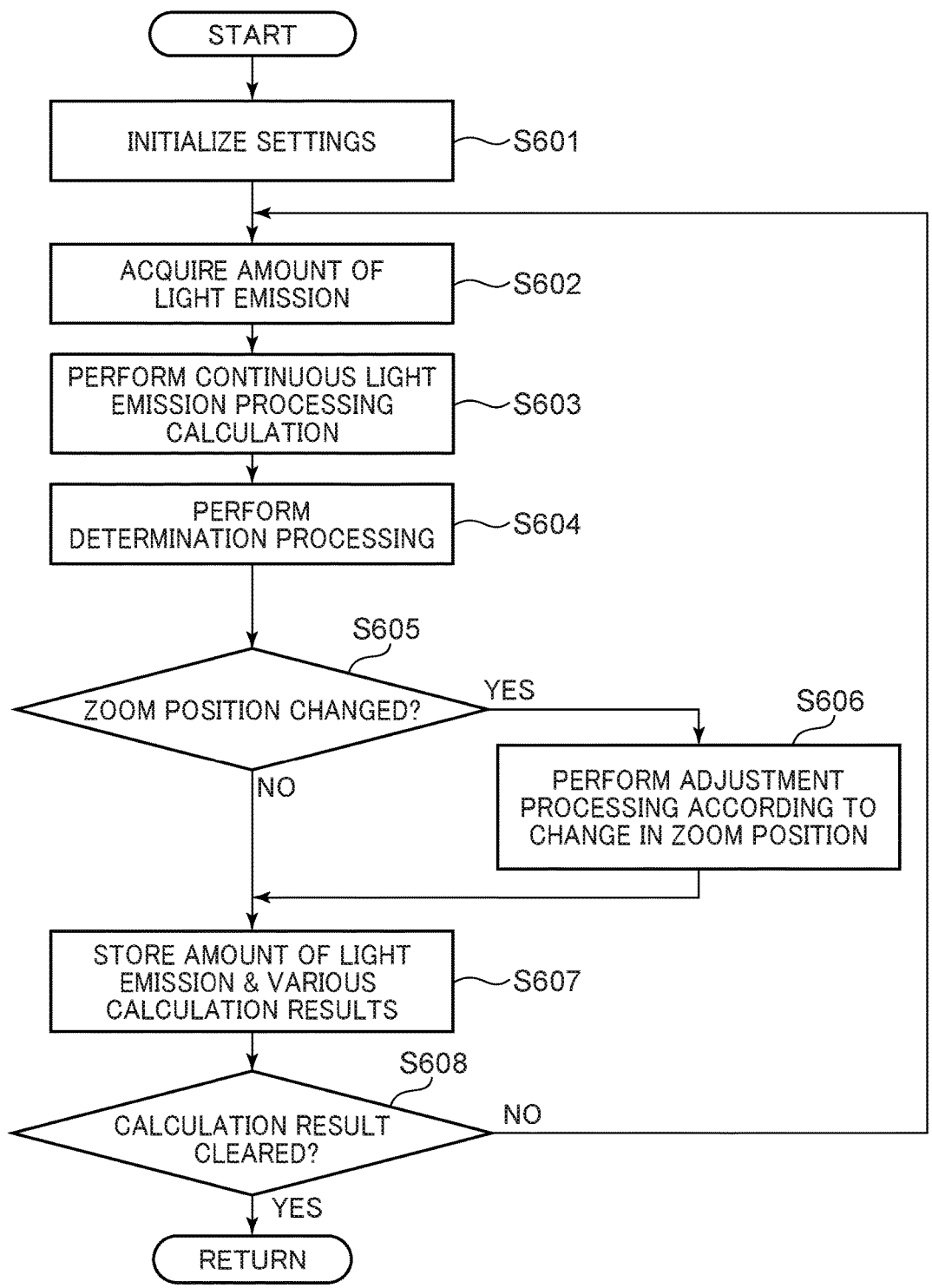
FIG. 6 is a flowchart of a continuous light emission control process performed in a step in FIG. 3.

FIG. 6 is a flowchart of the continuous light emission control process performed in the step S310 in FIG. 3.

Referring to FIG. 6, in a step S601, the strobe controller 101 reads preset input information and the parameter, so as to initialize the settings of the continuous light emission control, and proceeds to a step S602. Note that in a case where the reading has already been executed in the step S301 in FIG. 3, this step can be omitted.

In the step S602, the strobe controller 101 acquires information on the amount of light emission from the discharge tube 104 at the time of light emission, stores the acquired information on the amount of light emission in the built-in memory thereof, and proceeds to a step S603.

In the step S603, the strobe controller 101 performs calculation for continuous light emission processing. In the continuous light emission processing, the strobe controller 101 performs counting so as to make it possible to change the number of times of light emission, based on the parameter associated with the battery 200, stored in the built-in memory in the step S505 in FIG. 5. For example, a coefficient for calculation range adjustment is set based on the amount of light emission indicated by the information on the amount of light emission acquired in the step S602, and a value obtained by multiplying a value of the parameter stored in the step S505 in FIG. 5 by the coefficient is integrated whenever each light emission is performed. This makes it possible to perform the control according to the performance of the battery 200. As for subtraction, a subtraction amount, which is fixed, is subtracted whenever a predetermined time period elapses.

Assuming that the amount of light emission is represented by FL, the coefficient for adjustment is represented by a, the number of times of light emission is represented by n, the value of the parameter of the battery 200 is represented by B, the number of times of subtraction is represented by T, and the subtraction amount is represented by M, the integral amount C of the counter is calculated by the following equation (1):

$$C=(FL \times a \times n \times B)-(T \times M) \quad (1)$$

Here, calculation of the parameter in the steps S503 and S504 in FIG. 5 will be described. As indicated by the above equation (1), in the case of the method a integration according to light emission, as the parameter B of the battery 200 is larger, the counter integral amount C increases. Therefore, it is necessary to set a proper light emission limit using a threshold value, referred to hereinafter, for each protection target part.

First, in the step S503, since the battery 200 is determined as the dedicated battery, the parameter B of the battery 200 is calculated based on the information acquired from the battery 200. Assuming that the internal resistance value acquired in the step S402 in FIG. 4 is represented by r1, the internal temperature acquired in the step S403 is represented by τ1, and the correction values acquired in the step S407 are represented by Hr1 and Hτ1, the parameter B of the battery 200 can be calculated the following equation (2):

$$B=\{(r1+Hr1) \times \beta\}+\{(\tau 1+H\tau 1) \times \gamma\} \quad (2)$$

Similarly, in the step S504, since the battery 200 is determined as the general-purpose battery, the strobe controller 101 calculates the parameter B using the information acquired from the sensor section 118. Assuming that the internal resistance value acquired in the step S408 is represented by r2, and the internal temperature acquired in the step S409 is represented by τ2, the parameter B of the battery 200 can be calculated by the following equation (3):

$$B=(r2 \times \delta)+(\tau 2 \times \epsilon) \quad (3)$$

Note that β, γ, δ, and ε are gain coefficients. In the above equations (2) and (3), it is assumed that the internal resistance value and the internal temperature have been acquired in the respective associated steps. However in a case where only one of the internal resistance value and the internal temperature can be acquired, the parameter B may be calculated by substituting an upper limit value of a range of values estimated with respect to the other of the values which cannot be acquired, for the other of the values. Further, the parameter B may be calculated by setting the gain coefficient of the other of the values which cannot be acquired to 0, and unifying the two values into the acquired one of he internal resistance value and the internal temperature.

According to the above equations (2) and (3), for example, when using a battery which is small in internal resistance value and small in the amount of heat generation, the parameter B of the battery 200 becomes small, and it is possible to perform continuous light emission more number of times. On the other hand, when using a battery which is large in internal resistance value and large in the amount of heat generation, the parameter B of the battery 200 increases, so that the counter integral amount C is largely increased, which limits the number of times of continuous light emission. Although in the above equation (2), correction with respect to aging of the battery is factored into the internal resistance value, the correction may be separately factored into a gain coefficient. Note that even when a parameter which makes it possible to perform continuous light emission more number of times is set for the dedicated battery, the upper limit is set by the threshold value, referred to hereinafter, and hence the protection target part is protected.

Then, after performing calculation for continuous light emission, the strobe controller 101 stores the calculation result in the built-in memory thereof, and then proceeds to a step S604.

In the step S604, the strobe controller 101 determines whether or not the calculation result (the counter integral amount C) obtained in the step S603 is larger than the threshold value which is predetermined. The threshold value is only required to be determined by taking into consideration the configurations of the strobe device 100 and the memory 200, and the parameter stored in the built-in memory in the step S505 in FIG. 5. Further, an interval of inhibiting light emission (hereinafter referred to as the shortest light emission interval) may be set stepwise by setting the threshold value stepwise. If the calculation result obtained in the step S603 is larger than the threshold value, the strobe controller 101 extends the application of the shortest light emission interval. In a case where the threshold value is set stepwise, the application of the shortest light emission interval may be extended stepwise. Further, the threshold value can be set in a plurality for respective zoom positions associated with focal length information stored in the built-in memory in the step S304 in FIG. 3, and can be adjusted by holding a table in the EEPROM. Then, after determining whether or not the calculation result obtained in the step S603 is larger than the predetermined threshold value, the strobe controller 101 stores the determination result in the built-in memory thereof, and proceeds to a step S605.

In the step S605, the strobe controller 101 checks whether or not the zoom position has changed from the zoom position at the main light emission performed in the step S309 in FIG. 3. If the zoom position has not been changed, the strobe controller 101 proceeds to a step S607, whereas if the zoom position has been changed, the strobe controller 101 proceeds to a step S606.

In the step S606, the strobe controller 101 performs adjustment processing according to a change in the zoom position. In a case where the threshold value used in the step S604 varies with the zoom position, the strobe controller 101 adjusts the counter integral amount C obtained in the step S603. With this, in a case where the zoom position is moved between a zoom position for which a large threshold value is set and a zoom position for which a small threshold value is set, an integration ratio of the counter integral amount C with respect to each threshold value is equalized. The counter integral amount C is converted by using the following equation (4), assuming that the threshold value before the change is represented by SP, and the threshold value after the change is represented by SA:

$$C = C \times SA/SP \quad (4)$$

Then, after performing the adjustment processing according to the change in the zoom position, the strobe controller 101 stores the processing result in the built-in memory thereof, and proceeds to the step S607. In a case where the threshold value is not changed according to the zoom position, this step is omitted.

In the step S607, the strobe controller 101 stores the various calculation results and the parameter in the built-in memory thereof, and proceeds to a step S608. In a case where the various calculation results and the parameter have been stored in the built-in memory, this step may be omitted.

In the step S608, the strobe controller 101 Checks whether or not the counter integral amount C has been returned to the initial state, i.e. cleared, and if the counter integral amount C has been returned to the initial state, the strobe controller 101 terminates the continuous light emission control process, whereas if not, the strobe controller 101 returns to the step S602. In the present embodiment, a value obtained according to the parameter B of the battery 200 is integrated to thereby change the counter for limiting light emission, whereby the light emission limiting amount is changed according to the battery 200. However, a method of changing the threshold value according to the parameter B of the battery 200, or a method of providing a threshold value table formed in association with the parameter B of the battery 200 may be used.

As described above, in the present embodiment, it is possible to provide the strobe device 100 which is capable of performing product protection of the strobe device 100 from generated heat without impairing usability by properly controlling light emission, using the battery information of the removable battery 200 which supplies electric power necessary for starting the strobe device 100.

Next, a description will be given of a strobe device as a lighting device according to a second embodiment of the present invention with reference to FIGS. 7 and 8. In the present embodiment, the same components as those of the first embodiment are denoted by the same reference numerals, and description thereof is omitted.

The present embodiment differs from the first embodiment in that an authentication function using communication is provided between the strobe device and the battery, and a parameter for use in limiting light emission is determined based on communication information of a battery 250, which is transmitted and received between a power supply communication circuit 119 and a battery communication circuit 204.

Figure 7:
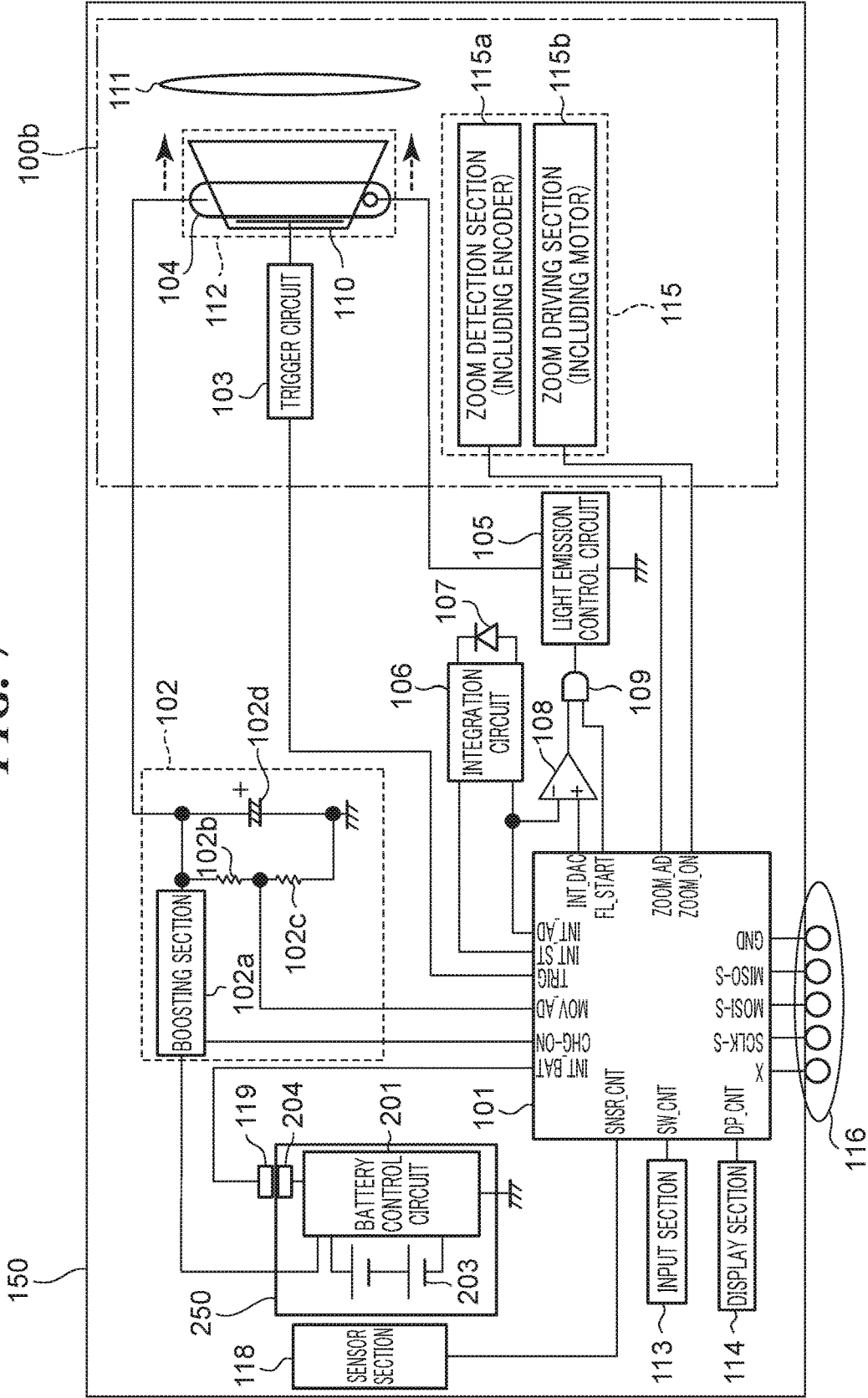
FIG. 7 is a schematic block diagram of a control system of a strobe device as a lighting device according to a second embodiment of the present invention.

FIG. 7 is a schematic block diagram of a control system of the strobe device, denoted by reference numeral 150, according to the present embodiment. As shown in FIG. 7, the power supply communication circuit 119 is comprised of a communication circuit having the authentication function and communication terminals, and performs bi-directional communication with the battery communication circuit 204. The power supply communication circuit 119 is connected to the strobe controller 101, and when the battery 250 is attached to the strobe device 150, the power supply communication circuit 119 is connected to the battery communication circuit 204, and transmits the various information received from the battery 250 to the strobe controller 101.

Note that one of the connection terminals of the power supply communication circuit 119 is an analog terminal, which enables the power supply communication circuit 119 to acquire an analog value directly from the associated one of the sensors of the battery control circuit 201 without via the communication circuit. In a case where the battery is a type which does not have a communication circuit but directly outputs an analog signal, the power supply communication circuit 119 acquires an output from the associated sensor of the battery control circuit 201 e.g. via the information output terminal 202 appearing in FIG. 2.

Next, the battery 250 will be described. The battery communication circuit 204 is comprised of a communication circuit having the authentication function and communication terminals, and performs bi-directional communication with the power supply communication circuit 119. The battery communication circuit 204 is connected to the battery control circuit 201, and when the battery communication circuit 204 is connected to the power supply communication circuit 119, the battery communication circuit 204 transmits the various information detected by the battery control circuit 201, the battery ID information stored in the ROM, and so forth to the strobe controller 101.

Figure 8:
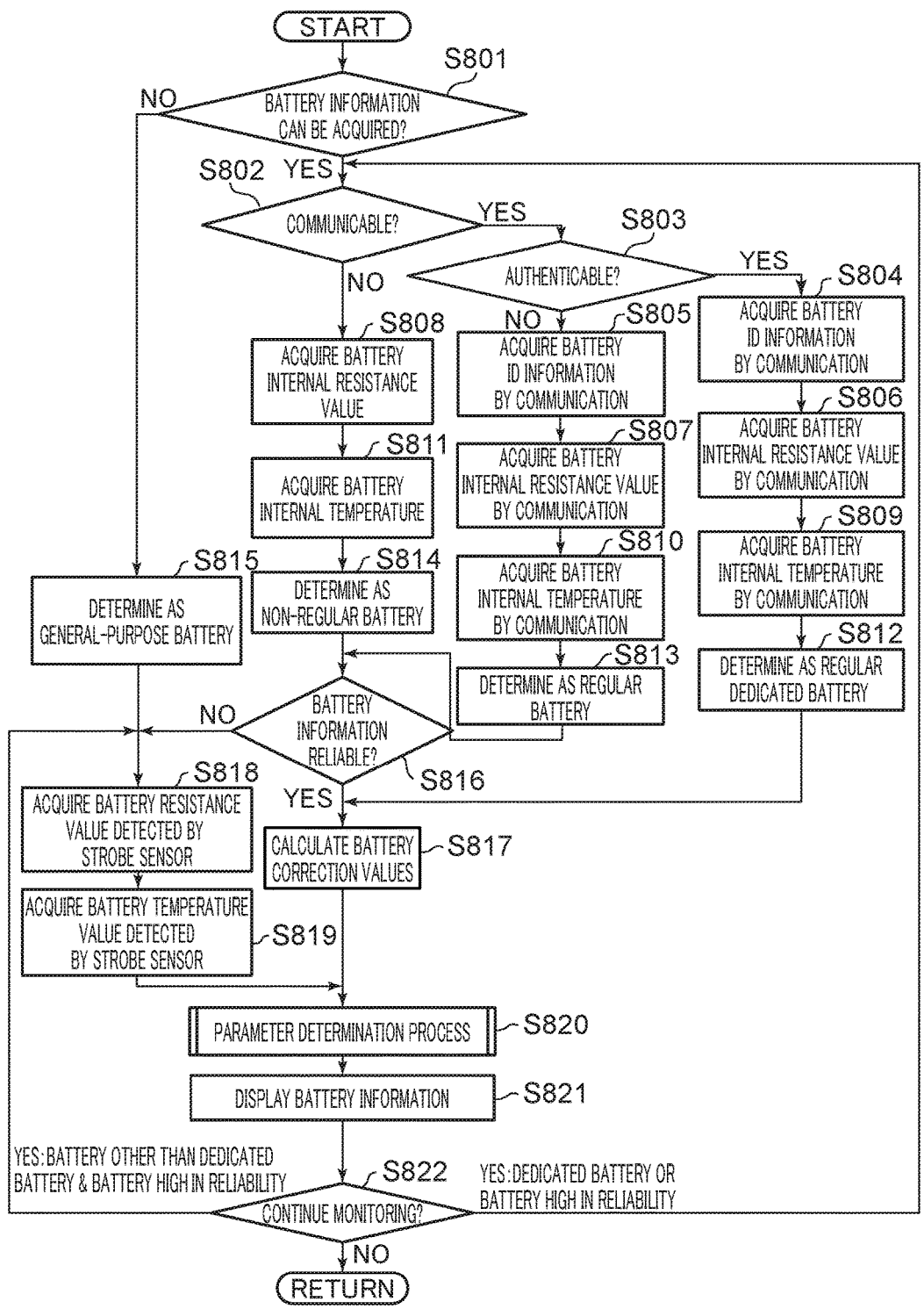
FIG. 8 is a flowchart of a variation of the battery identification control process performed in the step in FIG. 3.

FIG. 8 is a flowchart of a variation of the battery identification control process performed by the strobe device 150 in the step S302 in FIG. 3.

The strobe controller 101 determines in a step S801 whether or not it is possible to acquire the information on the temperature of the battery 250 attached to the strobe device 150 before performing the battery identification control. This determination is performed by using the method described in the first embodiment. That is, this determination is performed e.g. by determining whether or not an analog value is directly transmitted to the strobe controller 101, through connection of the various sensors included in the battery control circuit 201 to the battery communication circuit 204, and bringing the battery communication circuit 204 and the power supply communication circuit 119 into contact with each other.

Further, this determination is performed by determining whether or not values obtained by converting outputs from the various sensors from analog to digital by the battery control circuit 201 are transmuted to the strobe controller 101 by communication. Alternatively, the determination may be performed by providing an adapter which makes it possible to convert a general-purpose battery into one having the shape of a dedicated battery, and determining when the general-purpose battery is detected, that the battery information cannot be acquired because the attached battery is the general-purpose battery.

Referring to FIG. 8, if it is possible to acquire the information of the internal resistance value or the internal temperature of the battery 250 from the battery control circuit 201, the strobe controller 101 proceeds to a step S802, whereas if not, the strobe controller 101 proceeds to a step S815. In the step S815, since the information cannot be acquired from the attached battery 250, similarly to the step S405 in FIG. 4, the strobe controller 101 sets a determination bit indicative of a general-purpose battery and a determination bit indicative of low reliability, stores the set determination bits in the built-in memory thereof, and then proceeds to a step S818.

In the step S802, the strobe controller 101 determines whether or not it is possible to communicate with the battery 250 via the power supply communication circuit 119, and if it is possible, the strobe controller 101 proceeds to a step S803 whereas if it is not possible, the strobe controller 101 proceeds to a step S808. In the step S803, the strobe controller 101 determines whether or not the battery 250 can be authenticated via the power supply communication circuit 119, and if the battery 250 can be authenticated, the authentication is executed, whereafter the strobe controller 101 proceeds to a step S804, whereas if not, the strobe controller 101 proceeds to a step S805.

In the steps S804 and S805, the strobe controllers 101 acquires the battery identification information of the battery 250. The steps S804 and S805 are different in that the battery 250 has been authenticated or has not been authenticated in the step S803, and in the step S804 for the battery 250 which can be authenticated, it is possible to acquire the battery identification information, such as the battery ID information, except the cases of a temporary communication failure and aging. However, in the step S805 for the battery 250 which cannot be authenticated, there is a possibility that the battery identification information cannot be acquired. After acquiring the battery identification information, the strobe controller 101 stores the acquired battery identification information in the built-in memory thereof, and proceeds to a step S806 or S807. In a case where the battery identification information cannot be acquired, these steps are omitted.

In the steps S806 and S807, the strobe controller 101 acquires the internal resistance value of the battery 250 from the sensor of the battery control circuit 201 via the battery communication circuit 204 and the power supply communication circuit 119. Note that the internal resistance value may be calculated by acquiring a battery voltage and a discharge current using the sensors included in the battery control circuit 201 without directly acquiring the internal resistance value. The strobe controller 101 stores the acquired internal resistance value in the built-in memory thereof, and proceeds to a step S809 or S810. In a case where the internal resistance value cannot be acquired, these steps are omitted.

In the step S808, the strobe controller 101 cannot communicate with the attached battery 250. Therefore, the strobe controller 101 uses the same method as that used in the first embodiment, in which the information output terminal 202 is brought into contact with the battery detection terminal 117 to thereby transmit an analog value output from the sensor of the battery control circuit 201 directly to the strobe controller 101. The strobe controller 101 stores the acquired internal resistance value in the built-in memory thereof, and proceeds to a step S811. In a case where the internal resistance value cannot be acquired, this step is omitted.

In the steps S809 and the S810, the strobe controller 101 acquires the internal temperature of the battery 250 from the associated sensor of the battery control circuit 201 via the battery communication circuit 204 and the power supply communication circuit 119. The strobe controller 101 stores the acquired internal temperature in the built-in memory thereof, and then proceeds to a step S812 or S813. Note that in a case where the internal temperature cannot be acquired, these steps are omitted.

In the step S811, the strobe controller 101 cannot communicate with the attached battery 250. Therefore, the strobe controller 101 uses the same method as that used in the first embodiment, in which the information output terminal 202 is brought into contact with the battery detection terminal 117 to thereby transmit an analog value output from the sensor of the battery control circuit 201 directly to the strobe controller 101. The strobe controller 101 stores the acquired internal temperature in the built-in memory thereof, and proceeds to a step S814. In a case where the internal temperature cannot be acquired, this step is omitted.

In the step S812, the strobe controller 101 checks whether or not the result(s) acquired in the step(s) S806 and/or S809 is/are within (a) predetermined threshold value(s), which can be estimated from the battery identification information acquired in the step S804. If the acquired result(s) is/are within the predetermined threshold value(s) without occurrence of a communication failure or aging, the strobe controller 101 sets, by determining that the attached battery 250 is a regular dedicated battery, a determination bit indicative of a regular dedicated battery, and a determination bit indicative of high reliability. On the other hand, if any of the acquired result(s) is/are not within the predetermined threshold value(s), the strobe controller 101 determines that a communication failure has occurred in any of the steps S804, S806, and S809, or that the attached battery has aged, and set the determination bit indicative of a regular dedicated battery, and the determination bit indicative of low reliability, indicating that the result(s) acquired in the step(s) S806 and/or S809 is/are low in reliability. The strobe controller 101 stores the set determination bits in the built-in memory thereof, and proceeds to a step S817.

In the step S813, the strobe controller 101 checks whether or not the battery identification information acquired in the step S805 matches information stored in the built-in memory thereof as the information of a regular battery. If the acquired battery identification information matches the stored information, the strobe controller 101 determines that the battery 250 is a regular battery, sets a determination bit indicative of the regular battery, and checks whether or not the result(s) acquired in the step(s) S807 and/or S810 is/are within (a) predetermined threshold value(s) which can be estimated from the battery identification information acquired in the step S805.

Then, if the result(s) is/are within the predetermined threshold value(s), the strobe controller 101 sets a determination bit indicative of high reliability, indicating that the battery information is high in reliability. If the result(s) is/are not within the predetermined threshold value(s), the strobe controller 101 sets the determination bit indicative of low reliability, indicating that the result(s) acquired in the step(s) S807 and/or S810 is/are low in reliability. In a case where the acquired battery identification information does not match the stored battery identification information, the strobe controller 101 sets a determination bit indicative of an unknown battery and the determination bit indicative of low reliability, indicating that the result(s) acquired in the step(s) S807 and/or S810 is/are low in reliability. The strobe controller 101 stores the determination bits in the built-in memory thereof, and proceeds to a step S816.

In the step S814, the strobe controller 101 checks whether or not the result(s) acquired in the step(s) S808 and/or S811 is/are within (a) predetermined threshold value(s) which can be estimated. If the result(s) is/are within the predetermined threshold value(s), the strobe controller 101 sets a determination bit indicative of a non-regular battery and a determination bit indicative of medium reliability. If the result(s) is/are not within the predetermined threshold value(s), the strobe controller 101 determines that although an output has been received as the battery information, the received information is low in reliability, and sets the determination bit indicative of a non-regular battery and the determination bit indicative of low reliability. The strobe controller 101 stores the set determination bits in the built-in memory thereof, and proceeds to the step S816.

Here, FIG. 9 is a diagram showing determination bits which are set according to different cases in the steps S812 to S815. Although in FIG. 9, the reliability is determined in three levels in the steps S812 to S815, the reliability may be divided into a larger number of levels with small differences by taking the superiority/inferiority and the like in each step into account.

Referring again to FIG. 8, in the step S816, the strobe controller 101 determines whether or not the battery information of the attached battery 250 is reliable based on the determination bits determined in the steps S813 and S814. Then, if the information has a reliability of not lower than a predetermined level, the strobe controller 101 proceeds to the step S817 to perform the same processing as the step S407 in FIG. 4, and then proceeds to a step S820, whereas if not, the strobe controller 101 proceeds to the step S818, performs the same processing as the step S408 in FIG. 4, and proceeds to a step 819. In the step S819, the strobe controller 101 performs the same processing as the step S409 in FIG. 4, and proceeds to the step S820.

In the step S820, the strobe controller 101 determines a parameter for use in limiting light emission based on the information acquired in the steps S804 to S820, stores the determined parameter in the built-in memory thereof, and proceeds to a step S821. Details of the parameter determination process will be described hereinafter with reference to FIG. 10.

In the step S821, the strobe controller 101 displays the acquired information associated with the attached battery 250 on the display section 114 similarly to the step S411 in FIG. 4, and proceeds to a step S822.

In the step S822, the strobe controller 101 determines whether or not to monitor the state of the current battery 250. This determination is performed by determining whether or not a predetermined time period has elapsed using a timer function of the strobe controller 101. This causes, whenever a predetermined nine period elapses, the strobe controller 101 to monitor the state of the battery 250 at a predetermined period by acquiring an output result from the battery control circuit 201 or the sensor section 118. Note that the strobe controller 101 may monitor the state of the battery 250 not at a predetermined period, but based on a condition, such as the number of times of light emission from the light emission section 100b. If it is determined that monitoring of the battery 250 is to be performed, in a case where the battery 250 is determined to be the dedicated battery, or the battery information thereof is determined to be high in reliability, the strobe controller 101 returns to the step S802, or otherwise returns to the step S818. If it is determined that monitoring of the battery 250 is not to be performed, the battery identification control process is terminated.

Figure 10:
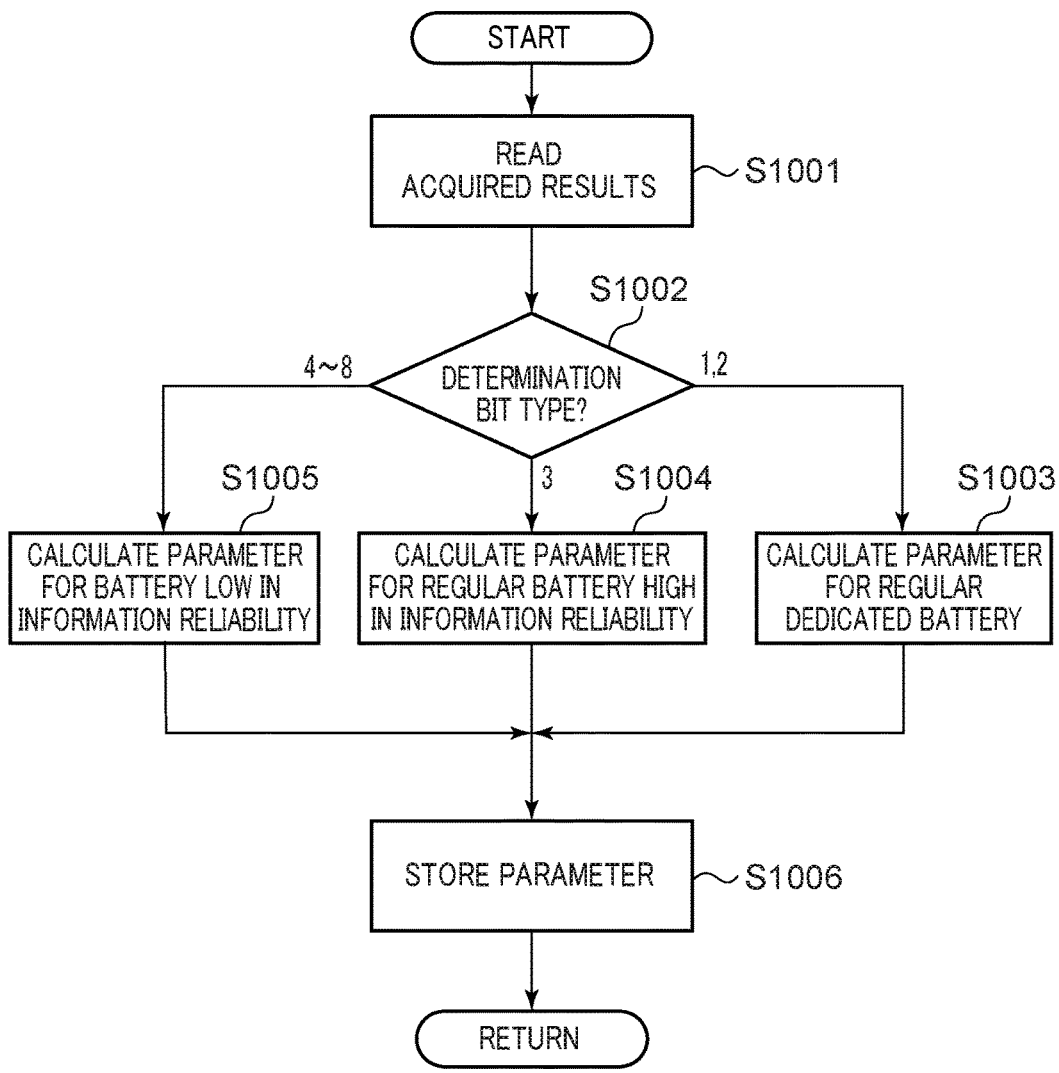
FIG. 10 is a flowchart of a parameter determination process performed in a step in FIG. 8.

Next, the parameter determination process performed in the step S820 in FIG. 8 will be described with reference to FIGS. 9 and 10. FIG. 10 is a flowchart of the parameter determination process performed in the step S820 in FIG. 8

Referring to FIG. 10, in a step S1001, the strobe controller 101 reads the determination bits, the output results from the various sensors, and the correction values, acquired in the steps S802 to S819, and proceeds to a step S1002.

In the step S1002, the strobe controller 101 determines which of the above-described determination bits, each read determination bit is. Then, if the determination bit indicative of the regular dedicated battery has been set, the strobe controller 101 proceeds to a step S1003, if the bits indicative of the regular battery and high reliability have been set, the strobe controller 101 proceeds to a step S1004, and if any of the other determination bits has been set, the strobe controller 101 proceeds to a step S1005. In FIG. 10, each branch is indicated by (a) determination number(s) indicated in FIG. 9. Although in FIG. 10, the medium reliability indicated in the determination number 6 in FIG. 9 is treated as the low reliability, the reliability may be determined by separately setting a threshold value.

In the step S1003, the strobe controller 101 calculates the parameter B of the battery 250 for use in limiting light emission for a regular dedicated battery. As the calculation method, not only the method described in the first embodiment, but also a method may be used in which a parameter table is stored in the built-in memory of the strobe controller 101 so as to make it possible to determine the parameter B, by using the parameter table, based on the battery identification information, such as a battery ID. Further, in a case where although the battery has been authenticated as indicated by the determination number 2 in FIG. 9, it is determined that the reliability is low e.g. due to a temporary communication failure or aging, the protection target pan is protected by making the monitoring period shorter or the condition more strict in the step S822 described above. Then, after calculating the parameter B, the strobe controller 101 proceeds to a step S1006.

In the step S1004, since it is determined that the battery information of the battery 250 is high in reliability, the strobe controller 101 calculates the parameter B of the battery 250 using the information acquired from the battery 250. The calculation is performed using the calculation method described in the first embodiment. In a case where the parameter B can be determined using the parameter table based on the batter identification information, such as a battery ID, the parameter B may be determined based on the parameter table. Then, after calculating the parameter B, the strobe controller 101 proceed to the step S1006.

In the step S1005, since it is determined that the battery information of the battery 250 is low in reliability, the strobe controller 101 calculates the parameter B of the battery 250 using the information acquired from the sensor section 180. The calculation is performed using the calculation method described in the first embodiment. Further, as indicated by the determination number 5 in FIG. 9, in a case where the attached battery is determined as an unknown battery in the battery identification determination, by enabling the user to select the type of the battery via the input section 113, a parameter corresponding to the selected battery type may be set as the parameter B.

Note that in the case described above, it is desirable to narrow the types of selection options displayed on the display section 114 within a range in which more safety is ensured, taking the results acquired in the steps S807 and S810 into account. In addition, in cases where the battery information is low in reliability, it is possible to further ensure safety by estimating the actual temperature of the battery 250 or the secondary battery cell 203 based on the internal temperature information acquired from the sensor section 118. For example, assuming that the internal temperature acquired in the step S819 is represented by $\tau 3$, variation in output from the sensor section 118 is represented by $\sigma$, and an offset correction value including e.g. measurement loss due to heat transfer is represented by $H\tau 3$, the actual temperature $\kappa$ of the secondary battery cell 203 can be expressed by the following equation (5):

$$\kappa = \tau 3 + H\tau 3 \pm \sigma \quad (5)$$

Therefore, the estimated maximum temperature of the temperature $\kappa$ of the secondary battery cell 203 can be calculated by using $+\sigma$ in the above equation (5). Further, the parameter B is calculated by substituting the following equation (6) into the above equation (3):

$$\tau 2 = \kappa \quad (6)$$

By using this method, it is possible to further ensure safety for a battery of which the battery information is low in reliability. Then, after calculating the parameter B using the above-described method, the strobe controller 101 proceeds to the step S1006.

After that, the strobe controller 101 performs the same processing as that of the first embodiment, followed by terminating the battery identification control process and the parameter determination process performed by the strobe device 150 according to the present embodiment.

As described heretofore, in the present embodiment, it is possible to perform the battery identification control process with higher accuracy by using the authentication function through communication between the strobe device 150 and the battery 250. The other configuration and advantageous effects are the same as those described for the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-004350 filed Jan. 15, 2018, which is hereby incorporated by reference herein in its entirety.

What is claimed is:

1. A lighting device that is capable of using a plurality of types of batteries attached thereto, and includes a light emission section to which electric power is supplied from a battery attached thereto,
    the lighting device comprising at least one processor that functions, according to one or more programs in a memory, as units comprising:
    a light emission control unit configured to control light emission from the light emission section; and
    an acquisition unit configured to acquire information on the battery, including information on a temperature of the attached battery,
    wherein the light emission control unit determines a parameter for use in limiting light emission from the light emission section based on a result of acquisition of the information on the battery by the acquisition unit.

2. The lighting device according to claim 1, wherein the units further comprise a judgment unit configured to judge whether or not it is possible to acquire the information on the battery from the attached battery,
    wherein in a case where it is judged by the judgment unit that the information on the battery can be acquired, the acquisition unit acquires the information on the battery from the battery.

3. The lighting device according to claim 2, wherein the units further comprise a sensor section that detects information on the battery, and
    wherein in a case where it is judged by the judgement unit that the information on the battery cannot be acquired, the acquisition unit acquires the information on the battery detected by the sensor section.

4. The lighting device according to claim 2, wherein the units further comprise a communication unit configured to be capable of performing communication concerning the information on the battery with the attached battery, and
    wherein in a case where it is judged by the judgment unit that the information on the battery can be acquired, the acquisition unit acquires the information on the battery from the battery via the communication unit.

5. The lighting device according to claim 4, wherein the units further comprise an authentication unit configured to determine whether or not the battery can be authenticated via the communication unit, and
    wherein in a case where it is determined by the authentication unit that the battery can be authenticated, the acquisition unit acquires the information on the battery from the battery via the communication unit.

6. The lighting device according to claim 1, wherein the units further comprise:
    a determination unit configured to determine reliability of the information on the battery acquired by the acquisition unit, and
    a sensor section that detects information on the battery, and
    wherein in a case where it is determined by the determination unit that the reliability of the information on the battery acquired by the acquisition unit is low, the acquisition unit acquires the information on the battery detected by the sensor section.

7. The lighting device according to claim 6, wherein the light emission control unit estimates a temperature of a battery based on the information on the battery detected by the sensor section, and determines the parameter for use in limiting light emission from the light emission section based on estimated maximum temperature of the battery.

8. The lighting device according to claim 1, further comprising a storage unit configured to store a table of the parameter, and
    wherein when determining the parameter for use in limiting light emission from the light emission section based on the information on the battery acquired by the acquisition unit, the light emission control unit uses the parameter table.

9. The lighting device according to claim 1, wherein the units further comprise a monitoring unit configured to monitor the parameter determined by the light emission control unit based on the acquired information on the battery, at a predetermined period or on a predetermined condition, and wherein in a case where it is determined by the monitoring unit that the determined parameter is not within a predetermined threshold value, the light emission control unit determines the parameter based on the information on the battery newly acquired by the acquisition unit, and updates the parameter.

10. The lighting device according to claim 1, wherein the light emission control unit displays information based on the determined parameter on a display section.

11. A method of controlling a lighting device that is capable of using a plurality of types of batteries attached thereto, and includes a light emission section to which electric power is supplied from a battery attached thereto, comprising:
controlling light emission from the light emission section;
acquiring information on the battery, including information on a temperature of the attached battery; and
determining a parameter for use in limiting light emission from the light emission section based on a result of acquisition of the information on the battery.

12. A non-transitory computer-readable storage medium storing a computer-executable program for executing a method of controlling a lighting device that is capable of using a plurality of types of batteries attached thereto, and includes a light emission section to which electric power is supplied from a battery attached thereto,
wherein the method comprises:
controlling light emission from the light emission section;
acquiring information on the battery, including information on a temperature of the attached battery; and
determining a parameter for use in limiting light emission from the light emission section based on a result of acquisition of the information on the battery.

* * * * *